G. A. & A. F. SCHÜTZ.
FILTERING DEVICE.
APPLICATION FILED JAN. 20, 1915.

1,141,213.

Patented June 1, 1915.

UNITED STATES PATENT OFFICE.

GUSTAV ADOLF SCHÜTZ AND ADOLF FRIEDRICH SCHÜTZ, OF WURZEN, GERMANY.

FILTERING DEVICE.

1,141,213.     Specification of Letters Patent.     Patented June 1, 1915.

Application filed January 20, 1915. Serial No. 3,388.

*To all whom it may concern:*

Be it known that we, GUSTAV ADOLF SCHÜTZ and ADOLF FRIEDRICH SCHÜTZ, subjects of the King of Saxony, residing at Wurzen, in the Kingdom of Saxony, Germany, have invented certain new and useful Improvements in Filtering Devices, of which the following is a specification.

Our invention relates to filtering devices and more especially to a filtering device, allowing the solid mass deposited upon the filtering elements (filter plates or the like) to be removed either continuously or intermittently, thereby keeping the surface of the filter elements in constant working condition.

The filtering devices referred to in this specification usually consist of a rotatable hollow shaft arranged horizontally within a casing or container and carrying a number of filter plates.

According to the present invention screw-conveyers are arranged between the filter plates, said conveyers lying above the level of the liquid to be filtered and being adapted to take the dry deposit formed off the plates and to remove it from the container. In order to augment the pressure acting upon the filter cake and to dry it to a certain degree, compressed air may be introduced into the container above the liquid level.

The drawings affixed to this specification show the preferred form of a device according to the invention.

Figure 1:
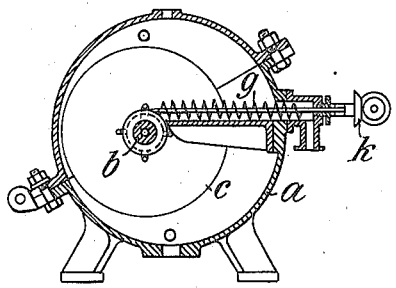
Figure 2:
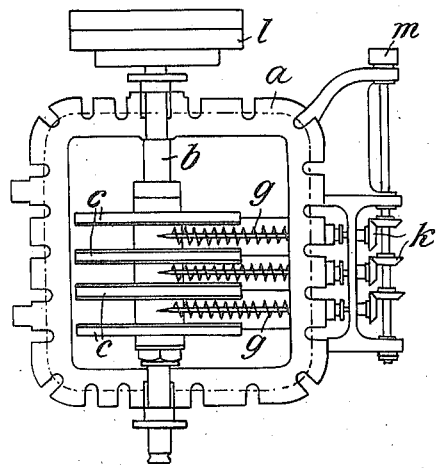

Figure 1 is a vertical section, and Fig. 2 is a plan (the upper half of the casing being removed).

*a* is the cylindrical casing or container in two parts, *b* is the hollow shaft, *c* are the filtering disks fixed on said shaft.

*g* are the screw-conveyers horizontally arranged between each two filter plates, *k* are bevel gears for rotating said conveyers, and *l*, *m* are pulleys for rotating the shaft and the conveyers respectively.

With this device the filtering process can be carried out either intermittently or continuously.

In the case of intermittent working the casing is entirely filled with the liquid and either pressure is put on or else a partial vacuum is created within the hollow shaft by means of a suitable pump. The liquid being thereby forced to permeate the filter disks, a layer of solid deposits is formed on the surface of said disks. As soon as this is fully effected, the liquid is tapped off, the residue on the filter plates is dried by pressing air through it and the hollow shaft and disks as well as the screw-conveyers are made to rotate, thus causing the residue to be carried away and out of the casing by the screws.

If it is desired to work continuously, the casing is again entirely filled with liquid and a layer of solid matter is again formed on the plates same as before. The liquid is then tapped off until its level is slightly below the screw-conveyers and the screws as well as the shaft and filter plates are made to rotate. Each part of each filter plate, before being submerged in the liquid, is thus freed from the deposited matter and on entering the liquid is ready to receive a fresh layer of solid residue.

We claim:—

1. In a filtering device, the combination with a receptacle, a hollow shaft rotatably arranged within said receptacle, filter elements fixed on said shaft in communication with its interior, of screw conveyers rotatably arranged between the filter plates and extending between the shaft and openings in the receptacle wall, and means for rotating the shaft and the conveyers.

2. In a filtering device, the combination with a receptacle, a hollow shaft rotatably arranged within said receptacle, filter elements fixed on said shaft in communication with its interior, of screw conveyers rotatably arranged between the filter plates and extending between the shaft and openings in the receptacle wall, means for rotating the shaft and the conveyers and means for introducing compressed air into the receptacle above the conveyers.

In testimony whereof we affix our signatures in presence of two witnesses.

GUSTAV ADOLF SCHÜTZ.
ADOLF FRIEDRICH SCHÜTZ.

Witnesses:
RUDOLPH FRICKE,
ALICE DUNGER.